United States Patent [19]

Saito et al.

[11] 4,433,405
[45] Feb. 21, 1984

[54] ROTARY RECORDING MEDIUM REPRODUCING APPARATUS HAVING A MECHANISM FOR CONNECTING A LID MEMBER TO A JACKET

[75] Inventors: Takashi Saito, Ayase; Masafumi Mochizuki, Yamato, both of Japan

[73] Assignee: Victor Company of Japan, Ltd., Yokohama, Japan

[21] Appl. No.: 294,802

[22] Filed: Aug. 20, 1981

[30] Foreign Application Priority Data

Aug. 20, 1980 [JP] Japan .................. 55-117740[U]

[51] Int. Cl.³ .................... G11B 5/82; G11B 25/04
[52] U.S. Cl. .............................................. 369/77.2
[58] Field of Search ............ 369/77, 219, 243, 249, 369/262, 263, 270, 271, 292, 77.2

[56] References Cited

U.S. PATENT DOCUMENTS

4,226,424 10/1980 Gordon ............................. 369/77
4,239,238 12/1980 Coleman .......................... 369/77

Primary Examiner—Steven L. Stephan
Attorney, Agent, or Firm—Louis Bernat

[57] ABSTRACT

A rotary recording medium reproducing apparatus reproduces a rotary recording medium accommodated within a case, where the case comprises a jacket provided with a space for accommodating the rotary recording medium and an opening for allowing the rotary recording medium to go in and out of the jacket, and a lid member inserted through the opening of the jacket for closing the opening of the jacket. The rotary recording medium reproducing apparatus comprises an inserting opening through which the case is inserted, a mechanism provided at an innermost part of the reproducing apparatus, for locking and leaving the lid member inside the reproducing apparatus when the case is inserted into the reproducing apparatus, and for releasing the locking with respect to the lid member when an empty jacket is inserted into the reproducing apparatus, and a lid member-jacket connecting mechanism for releasing connection of the lid member with respect to the jacket when the case is inserted into and then pulled out from the reproducing apparatus, and for connecting the lid member to the jacket when the jacket is inserted into and then pulled out from the reproducing apparatus. The lid member-jacket connecting mechanism connects the lid member to the jacket in response to the starting of an operation in which the jacket is pulled out from a final inserting position of the jacket within the reproducing apparatus.

6 Claims, 5 Drawing Figures

ROTARY RECORDING MEDIUM REPRODUCING APPARATUS HAVING A MECHANISM FOR CONNECTING A LID MEMBER TO A JACKET

BACKGROUND OF THE INVENTION

The present invention generally relates to rotary recording medium reproducing apparatuses capable of placing and leaving a rotary information recording medium in a state possible for reproduction within the reproducing apparatus when a jacket having a lid member for accommodating the recording medium therein is inserted into and then pulled out from within the reproducing apparatus, and also capable of incasing the recording medium within the jacket so that the recording medium can be obtained outside the reproducing apparatus together with the jacket, when the empty jacket is inserted into and then pulled out from within the reproducing apparatus. The present invention relates more particularly to a rotary recording medium reproducing apparatus having a mechanism for connecting the lid member to the jacket when the rotary recording medium inside the reproducing apparatus is to be accommodated within the jacket and obtained outside the reproducing apparatus.

Conventionally, in an apparatus for reproducing a rotary recording medium (referring to video disc, PCM audio disc, and the like, and hereinafter simply referred to as a disc), there are types of apparatuses in which a disc is reproduced when the disc is loaded upon clamping and placing of the disc within the reproducing apparatus, by inserting into and then pulling out a disc jacket (disc case) which has a lid and accommodates a disc therein, from within the reproducing apparatus.

As a conventional apparatus of this type, a reproducing apparatus was proposed in a U.S. patent application Ser. No. 231,868 filed Feb. 5, 1981, entitled "DISC-SHAPED RECORDING MEDIUM REPRODUCING APPARATUS" in which the assignee is the same as that of the present application. This previously proposed reproducing apparatus operates together with a disc case comprising a jacket which has a space for accommodating a disc and an opening for allowing the disc to go in and out of the jacket, and a lid member inserted through the opening of the jacket for closing the opening of the jacket, where the reproducing apparatus comprises an inserting opening through which the case is inserted, a turntable for rotating the disc, holding means provided at an innermost part on the opposite side from the inserting opening with respect to the turntable, for holding the lid member, lowering and raising means for lowering the disc to a position where the disc is placed on the turntable from a holding position where the disc is held by the holding means upon starting of the reproduction and raising the disc to the holding position from the turntable upon finishing or discontinuing of the reproduction, a reproducing transducer for reproducing the disc placed on the turntable, and moving means for moving the reproducing transducer from a waiting position to a reproducing position with respect to the disc.

In the above reproducing apparatus, a mechanism is provided for releasing connection of the lid member with respect to the jacket when the disc case is inserted into he reproducing apparatus to load the disc inside the reproducing apparatus, and for connecting the lid member left within the reproducing apparatus to the jacket when an empty jacket is inserted into the reproducing apparatus to recover the disc inside the reproducing apparatus.

In the conventional mechanism for connecting the lid member to the jacket, engagement releasing arm members are fixedly provided at innermost parts of the reproducing apparatus, with a predetermined positional relationship with respect to lid member clamping means and the like. When the disc case is inserted into the reproducing apparatus, the engagement releasing arm members relatively push and displace engaging arms of the lid member, to release the connection of the lid member with respect to the jacket. Further, when an empty jacket is inserted into a final position and then pulled out, the lid member follows the jacket due to the action of a spring. As the lid member moves to a predetermined position by following the jacket, the engaging arms of the lid member respectively separate from the engagement releasing arm members and return to the original states. Accordingly, the lid member is connected to the jacket by these engaging arms.

Since the engagement releasing arm members are fixedly provided in the above conventional mechanism, the position where the engaging arms of the lid member separate from the engagement releasing arm members when the jacket is pulled out from the reproducing apparatus, that is, an anticipated position where the lid member connects to the jacket, is at a relatively separated position from the final inserting position of the jacket.

Moreover, there are cases where an operation is performed to insert the jacket into the final position and then pull out the jacket in a rapid manner, upon recovering of the disc within the jacket. When the jacket is pulled out rapidly, the initial moving speed of the jacket is not high since the movement is immediately after the moving direction of the jacket has reversed. However, the moving speed of the jacket gradually increases as the jacket separates from the final inserting position. Therefore, when the anticipated position where the lid member connects to the jacket is relatively separated from the final inserting position of the jacket as in the conventional mechanism, the moving speed of the jacket becomes relatively high when the jacket reaches the above anticipated position. Hence, it becomes impossible for the lid member to follow the movement of the jacket. As a result, by the time the lid member reaches the above anticipated position where the lid member connects to the jacket, the jacket has already passed beyond the anticipated position. Accordingly, only the jacket is pulled out from the reproducing apparatus without being connected to the jacket, and the disc cannot be recovered within the jacket.

That is, in the conventional reproducing apparatus, there was a disadvantage in that the disc cannot be recovered within the jacket, when the operation to recover the disc from the reproducing apparatus is performed in a rapid manner.

SUMMARY OF THE INVENTION

Accordingly, it is a general object of the present invention to provide a novel and useful rotary recording medium reproducing apparatus having a mechanism for connecting a lid member to a jacket, in which the above described problems have been overcome.

Another and more specific object of the present invention is to provide a rotary recording medium reproducing apparatus having a mechanism for connecting a lid member to a jacket at an initial stage of the operation in which the jacket is pulled out, when an operation is performed in which the jacket is inserted into the reproducing apparatus and then pulled out from the reproducing apparatus in order to recover a rotary recording medium inside the reproducing apparatus. According to the apparatus of the present invention, the connection of the lid member with respect to the jacket is positively performed even when an operation is performed in which the jacket is pulled out from the reproducing apparatus in a rapid menner, and the rotary recording medium can be positively recovered within the jacket.

Other objects and further features of the present invention will be apparent from the following detailed description when read in conjunction with the accompanying drawings.

DETAILED DESCRIPTION

Figure 1:
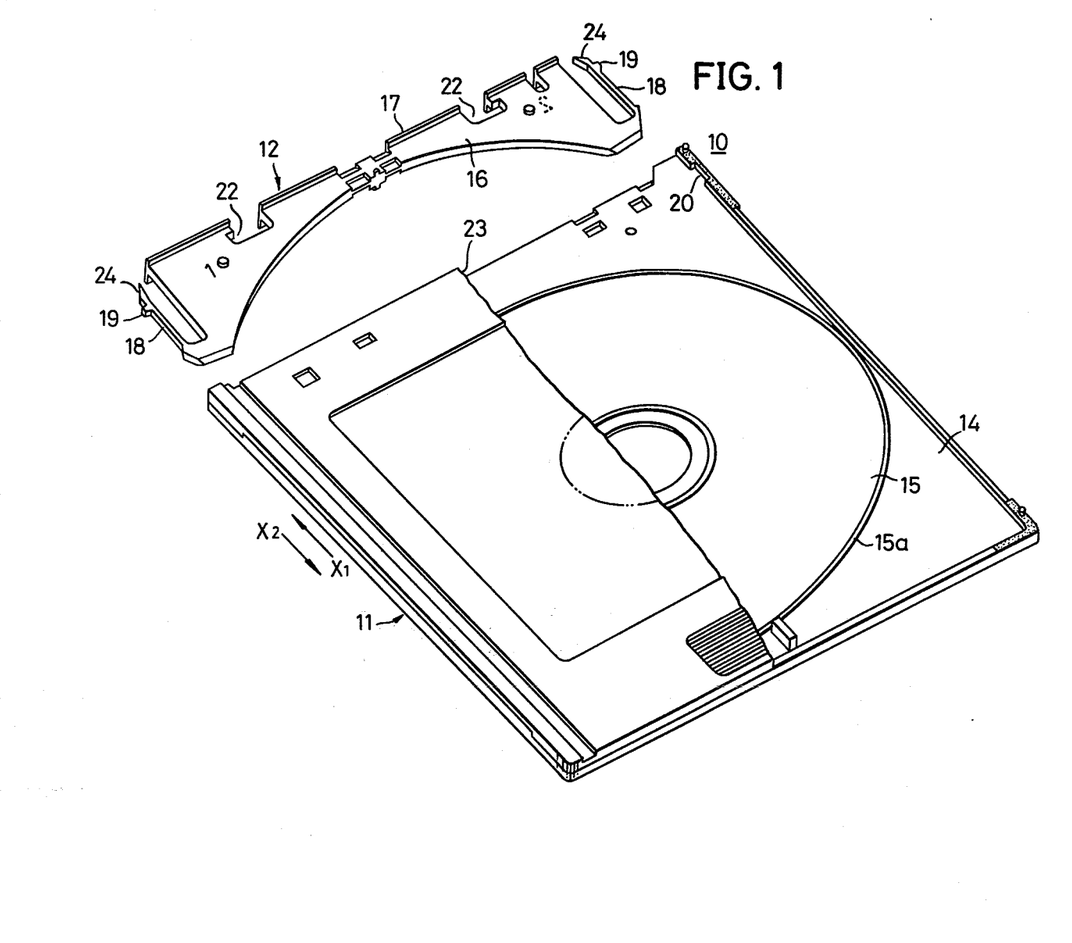
FIG. 1 is a perspective view, with a part cut away and disassembled, showing an example of a disc case which operates together with a rotary recording medium reproducing apparatus according to the present invention.

In FIG. 1, a disc case 10 comprises a jacket 11 and a lid plate 12. The jacket 11 is assembled from a pair of jacket halves 13 and 13, and comprises a flat cavity or space 14 therein. An opening 23 is provided on one side of the jacket 11, and the space 14 accommodates a disc 15. The lid plate 12 comprises a plate-shaped main lid body 16, and a rim portion 17 formed unitarily at the front edge of the main lid body 16. A pair of engaging arms 18 are formed on both sides of the main lid body 16. The main lid body 16 of the lid plate 12 is inserted into a predetermined position within the jacket 11. Moreover, projections 19 of the engaging arms 18 engage into depressions 20, and thus, the lid plate 12 connects with the jacket 11.

Figure 2:
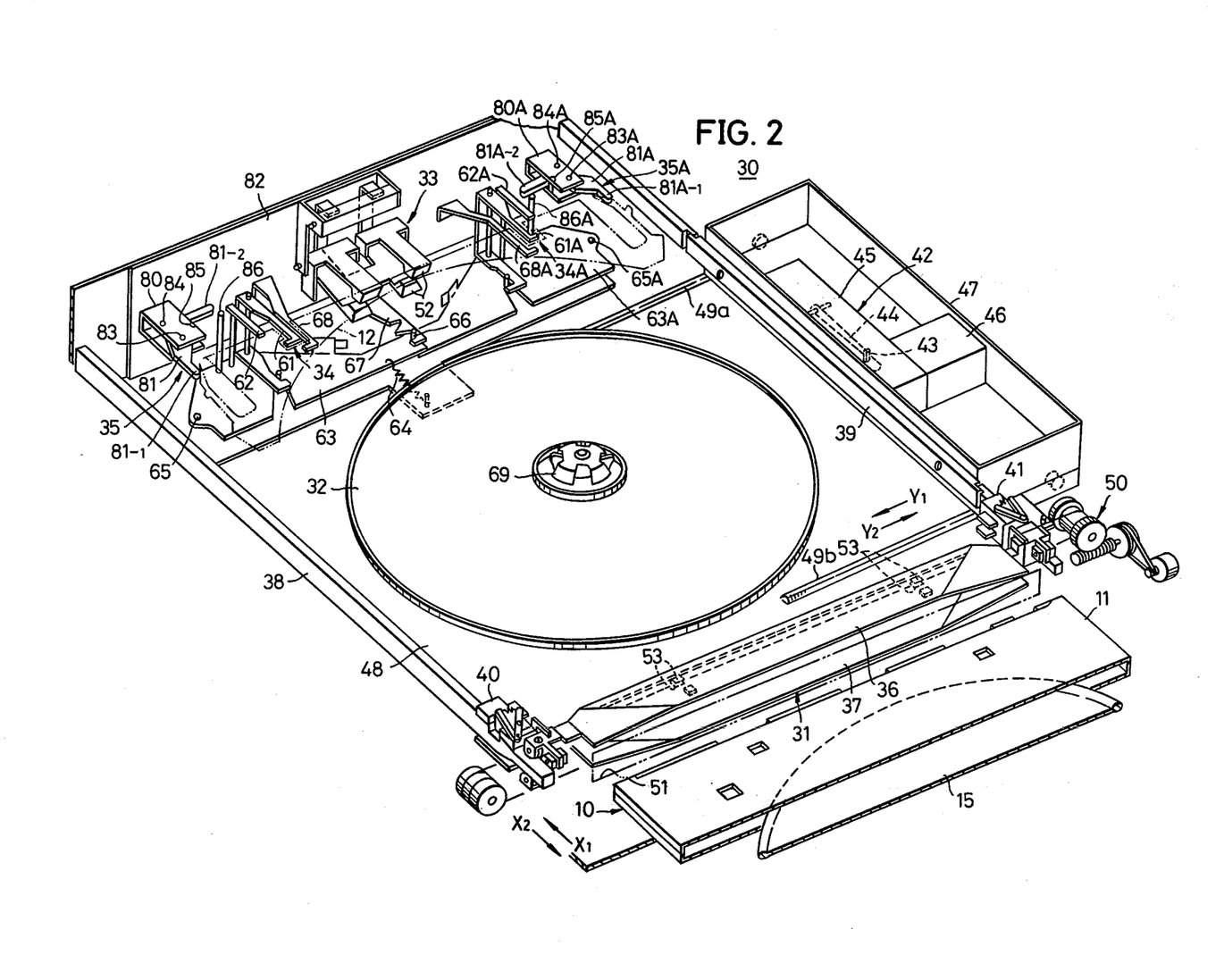
FIG. 2 is a perspective view, with a part cut away, showing the inner construction of an embodiment of a rotary recording medium reproducing apparatus according to the present invention.

As shown in FIG. 2, a reproducing apparatus 30 substantially comprises a jacket opening enlarging mechanism 31, a turntable 32 to rotate the disc 15 positioned thereon, a disc holding mechanism 33 for clamping the disc 15, a lid plate locking mechanisms 34 and 34A for locking the lid plate 12, lid plate-jacket connecting mechanisms 35 and 35A which form essential parts of the apparatus according to the present invention, for connecting the lid plate 12 to the jacket 11 upon recovering of the disc 15, and the like.

The jacket opening enlarging mechanism 31 comprises upper and lower beams 36 and 37 extending in the directions of arrows Y1 and Y2, and the supporting members (sliders) 60 and 61 which are respectively fixedly inserted into guide rails 38 and 39, to support both ends of the respective beams 36 and 37. The jacket opening enlarging mechanism 31 is guided by the guide rails 38 and 39, and moves between an innermost part of the reproducing apparatus 30 and a disc case inserting opening 51 provided at the frame of the reproducing apparatus 30, in the directions of arrows X1 and X2.

A reproducing transducer 42 comprises a pickup device 45 including a cantilever 44 provided with a reproducing stylus 43, a resonator 46 and the like, and is mounted to a carriage 47. The carriage 47 is transferred in the directions of the arrows Y1 and Y2 by means of a transferring mechanism 50, in a state where rollers provided on the carriage 47 roll along rails 49a and 49b respectively provided on a chassis 48.

The disc holding mechanism 33 is provided at the inner part of the reproducing apparatus 30 on the opposite side of the inserting opening 51, and comprises a pair of upper and lower holding fingers 52.

Upon reproduction of the disc 15, the disc case 10 is inserted through the inserting opening 51 of the reproducing apparatus 30, by inserting the disc case 10 with the side of the lid plate 12 into the direction of the arrow X1. When the jacket opening enlarging mechanism 31 is pushed and moved in the direction of the arrow X1 by the disc case 10, the upper and lower beams 36 and 37 rotate, and enlarging fingers 53 thus respectively move in directions so as to mutually separate from each other. Accordingly, the front part of the upper and lower jacket halves 13 is enlarged upwards and downwards, to enlarge the opening of the jacket 11.

When the disc case 10 is inserted into the innermost part of the reproducing apparatus 30 together with the enlarging mechanism 31 through the upper side of the turntable 32, the upper and lower holding fingers 52 respectively hold a groove guard 15a of the disc 15.

Accompanied by the insertion of the disc case 10, locking fingers 61 and 61A relatively enter inside L-shaped cutouts 22 of the lid plate 12, and the rim portion 17 accordingly pushes contact fingers 62 and 62A. When the contact fingers 62 and 62A are pushed by the lid plate 12, left and right main levers 63 and 63A respectively rotate in counterclockwise and clockwise directions about shafts 65 and 65A, against a force exerted by a spring 64. Hence, a connection pin 66 is latched by a latch plate 67. Due to the above rotations of the main levers 63 and 63A, the locking fingers 61 and 61A respectively rotate so as to separate from each other towards the left and right hand sides. Accordingly, the locking fingers 61 and 61A enter within the cutouts 22, to lock the lid plate 12. Therefore, the lid plate 12 is locked and held at the innermost part of the reproducing apparatus 30, in a state where the lid plate 12 is placed onto support fingers 68 and 18A.

Further, due to the operation of the lid plate-jacket connecting mechanism 35 and 35A, the connection between the lid plate 12 and the jacket 11 is released, as will be described hereinafter.

Figure 3:
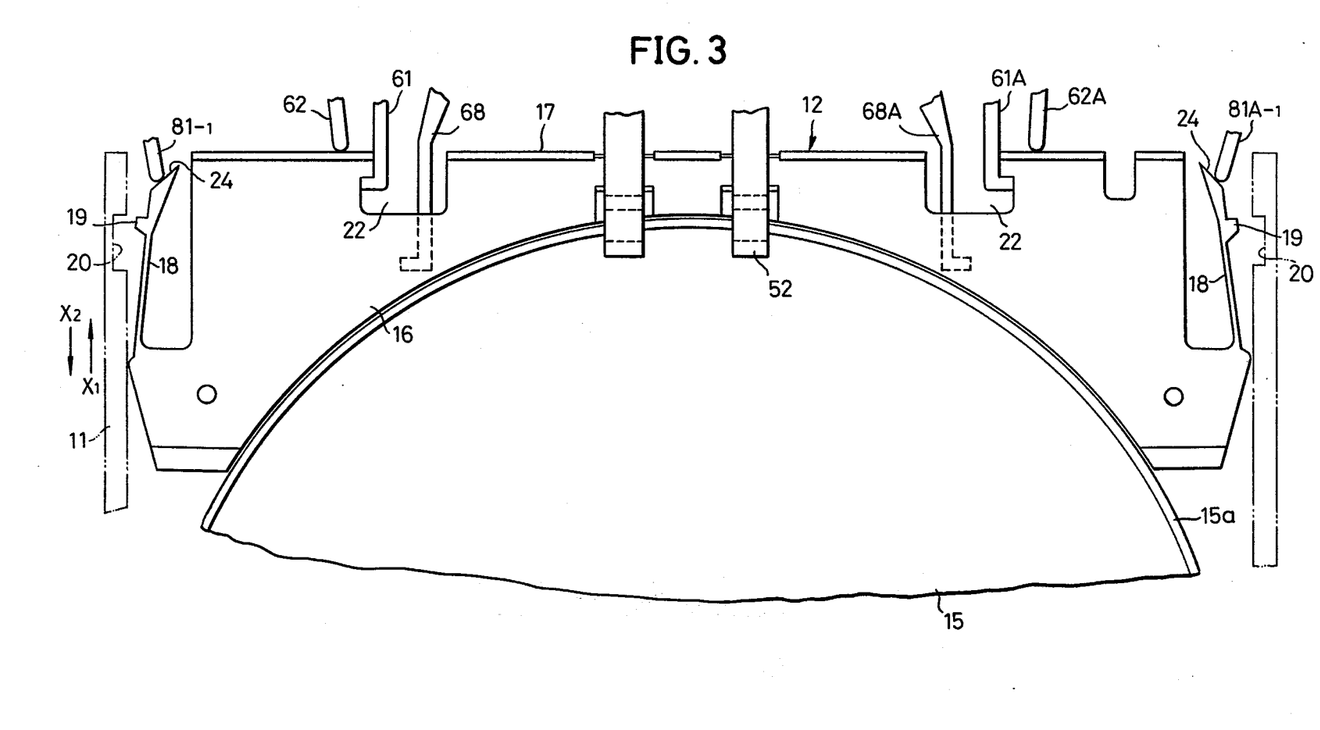
FIG. 3 is a plan view showing a state where a lid plate is separated from a jacket and locked and held within the reproducing apparatus.

Hence, when the disc case 10 is pushed into the final position, the connection of the lid plate 12 with respect to the jacket 11 is released, and the lid plate 12 becomes locked by the locking fingers 61 and 61A, as indicated by the two-dot chain line in FIG. 2 and in FIG. 3. Thus, the disc 15 is in a state held by the upper and lower holding fingers 52.

Next, the jacket 11 is pulled out in the direction of the arrow X2. Since the lid plate 12 and the disc 15 are respectively locked and held as described above, only the jacket 11 moves in the direction of the arrow X2, leaving behind the lid plate 12 and the disc 15. Accompanied by this operation in which the jacket 11 is pulled out from the reproducing apparatus 30, the lid plate 12 and the disc 15 are relatively pulled out from the jacket 11. In a state where the jacket 11 is separated from the enlarging mechanism 31 and is completely pulled out from the reproducing apparatus 30, the disc 15 is supported horizontally at a position directly above the turntable 32, by the holding fingers 52 and a support structure 69 which is in a raised position.

When a play operation is performed, the disc 15 is lowered and placed onto the turntable 32, and is clamped. In addition, the disc 15 is rotated towards a clockwise direction together with the turntable 32.

Moreover, the carriage 47 moves in the direction of the arrow Y1 from a waiting position, to reproduce the information signal by the reproducing stylus 43 which relatively scans the recording surface of the disc 15.

Next, an operation in which the disc 15 is recovered from within the reproducing apparatus 30, will now be described.

Upon completion of the reproducing operation, the disc 15 is pushed upwards by the support structure 69. The disc 15 which is pushed up, is held by the disc holding mechanism 33.

Upon recovering of the disc 15, an empty jacket 11 is again inserted into the reproducing apparatus 30 through the inserting opening 51, with the opening of the jacket 11 first. Thus, the enlarging mechanism 31 is pushed by the jacket 11 and moves in the direction of the arrow X1, to enlarge the opening of the jacket 11. As the jacket 11 is inserted towards the direction of the arrow X1, the disc 15 is relatively inserted into the jacket 11 through the opening of the jacket 11.

When the jacket 11 is inserted into the innermost position inside the reproducing apparatus 30, the disc 15 becomes completely incased within the jacket 11, and furthermore, the locked lid plate 12 is relatively inserted within the opening of the jacket 11 to close the opening of the jacket 11.

In addition, the latch with respect to the main levers 63 and 63A are released, and the main levers 63 and 63A rotationally return by following the movement of the jacket 11 which is pulled out in the direction of the arrow X2. Moreover, due to the operation of the lid plate-jacket connecting mechanisms 35 and 35A, the lid plate 12 becomes connected to the jacket 11 as will be described hereinafter.

Therefore, when the jacket 11 is pulled out in the direction of the arrow X2, the lid plate 12 then moves in the direction of the arrow X2 together with the jacket 11, and the disc 15 is pushed by the lid plate 12 and forcibly pushed out in the direction of the arrow X2 by the holding part. Accordingly, the disc 15 separates from the reproducing apparatus 30 to be recovered within the disc case 10.

Next, description will be given with respect to the construction and operation of the lid plate-jacket connecting mechanisms 35 and 35A which form essential parts of the apparatus according to the present invention, with reference to FIGS. 4 and 5.

The lid plate-jacket connecting mechanisms 35 and 35A are respectively provided at the left and right sides of the reproducing apparatus 30 in a symmetrical manner, at the innermost part of the reproducing apparatus 30. The lid plate-jacket connecting mechanisms 35 and 35A have rotary arms 81 and 81A within U-shaped holders 80 and 80A. The holders 80 and 80A are fixed to a rear surface wall 82 of the reproducing apparatus 30. The above rotary arms 81 and 81A are respectively axially supported by pins 83 and 83A within the holders 80 and 80A in a manner such that the rotary arms 83 and 83A can respectively rotate between pins 84 and 85, and pins 84A and 85A. Furthermore, the rotary arms 81 and 81A respectively have arm portions 81-1 and 81A-1 extending along the direction of the arrow X2, and arm portions 81-2 and 81A-2 extending along the horizontal direction.

Locking pins 86 and 86A are respectively embeddedly provided at predetermined positions on the main levers 63 and 63A, separated from and opposing the arm portions 81-2 and 81A-2.

Figure 4:
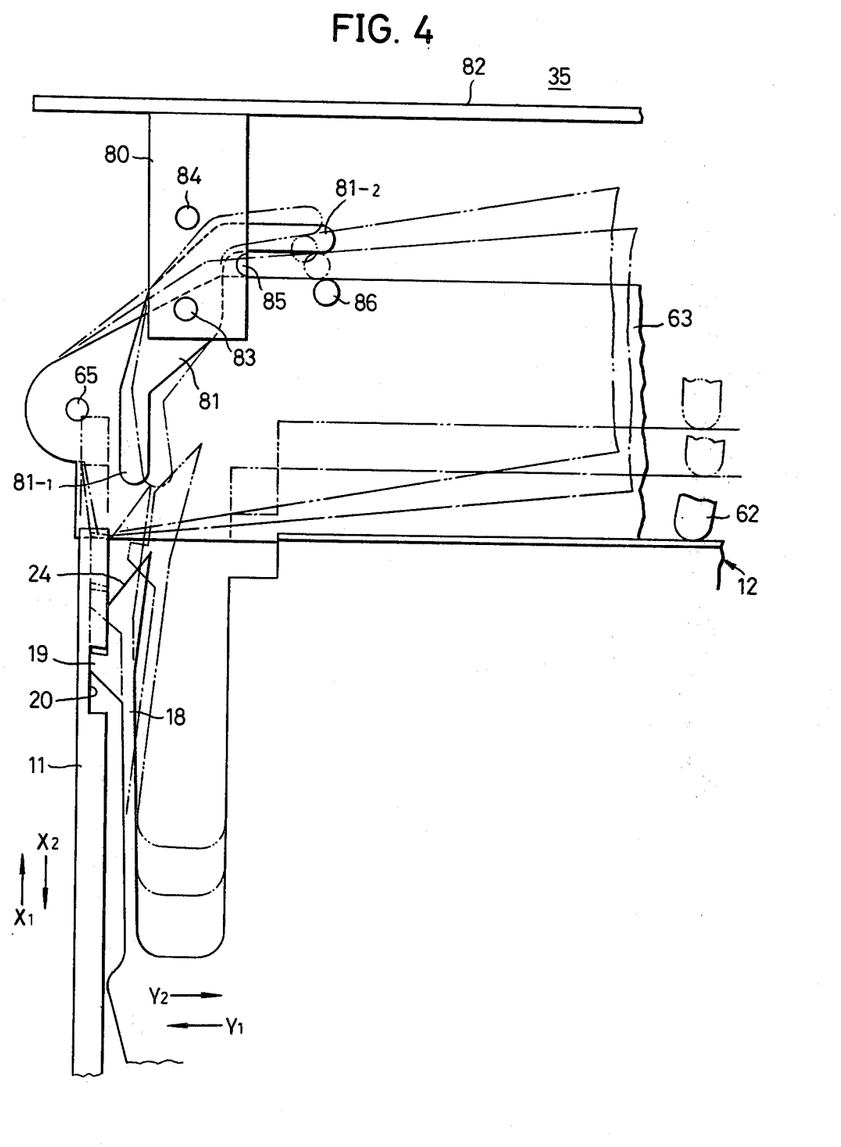
FIG. 4 is a plan view showing an embodiment of a mechanism for connecting a lid member to a jacket which forms an essential part of the rotary recording medium reproducing apparatus according to the present invention, for explaining operations in which the connection of the lid plate with respect to the jacket is released and the lid plate is connected to the jacket.

In a state before the disc case 10 is inserted into the reproducing apparatus 30, the rotary arms 81 and 81A are at rotational positions shown in FIG. 1, that is, at positions indicated by a solid line in FIG. 4.

When the disc case 10 is inserted into the innermost part of the reproducing apparatus 30 in order to load the disc 15, the contact finger 62 is pushed by the lid plate 12, and the main lever 63 accordingly is rotated towards the counterclockwise direction. Accordingly, the lid plate-jacket connecting mechanism 35 and the disc case 10 successively change from a state indicated by a one-dot chain line to a state indicated by a two-dot chain line in FIG. 4.

Due to the initial rotation of the main lever 63, the rotary arm 81 does not rotate and remains at the original position during the period in which the locking pin 86 moves from a position indicated by a solid line to a position indicated by the one-dot chain line in FIG. 4. Hence, in this state, the arm portion 81-1 is at a position where it is possible for the arm portion 81-1 to enter within the opening 23 of the jacket 11 at the left end side thereof. When the locking pin 86 moves to the above position indicated by the one-dot chain line in FIG. 4, the disc case 10 is inserted into a position indicated by the one-dot chain line. Moreover, a part of the arm portion 81-1 of the rotary lever 81 is inserted into the left end side of the opening 23 of the jacket 11.

When the disc case 10 is further inserted from the above position, to the final position indicated by the two-dot chain line, the locking pin 86 moves to the position indicated by the two-dot chain line. The locking pin 86 pushes the arm portion 81-2, and rotates the rotary arm 81 towards the counterclockwise direction. Due to the rotation of the rotary arm 81, the arm portion 81-1 locks and forcibly displaces a tip end sloping part 24 provided on the engaging arm 18 of the lid plate 12 which is moving in the direction of the arrow X1, towards the direction of the arrow Y2. Accordingly, the projection 19 slips out from the depression 20. The lid plate-jacket connecting mechanism 35A provided on the right end side at the innermost part of the reproducing apparatus 30, operates in a manner similar to the above lid plate-jacket connecting mechanism 35. Further, the main lever 63 is latched at the rotated position by the latch plate 67.

Figure 5:
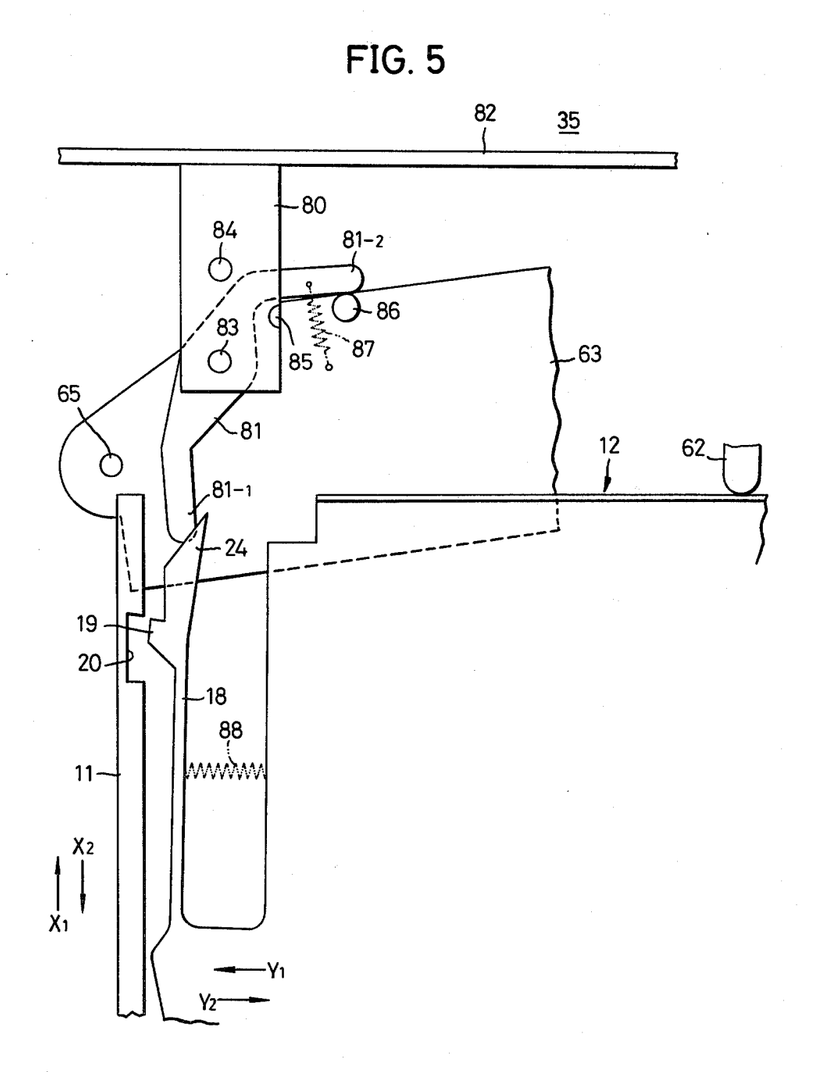
FIG. 5 is a plan view showing a mechanism for connecting a lid member to a jacket, in a state where the lid plate is separated from the jacket.

Therefore, as shown in FIGS. 3 and 5, the connection of the lid plate 12 with respect to the jacket 11 is released, and the lid plate 12 is locked and held at the innermost part of the reproducing apparatus 30.

Next, when an empty jacket 11 is inserted into the innermost part of the reproducing apparatus 30 in order to recover the disc 15, the latching operation by the latch plate 67 with respect to the lid plate 12 is released. Accordingly, the main lever 63 rotationally returns in the clockwise direction due to the spring force exerted by the spring 64. At this point, the lid plate 12 is pushed by the contact finger 62, and is pushed back towards the direction of the arrow X2 together with the jacket 11.

Due to the returning operation of the main lever 63, the locking pin 86 returns from the position shown in FIG. 5 (the position indicated by the two-dot chain line in FIG. 4) to the position indicated by the solid line in FIG. 4 through a position indicated by the one-dot chain line in FIG. 4. On the other hand, in a state where the lid plate 12 is held at the innermost part of the reproducing apparatus 30, the engaging arm 18 is resiliently deformed towards the direction of the arrow Y2. Hence, the rotary arm 81 is urged to rotate in the clockwise direction by a resilient rotational force exerted by the engaging arm 18.

Therefore, upon starting of the above movement by the locking pin 86, the rotary arm 81 rotates in the clockwise direction. The arm portion 81-1 of the rotary arm 81 moves towards the direction of the arrow Y1. Accordingly, simultaneously as the jacket 11 is pulled out, the engaging arm 18 is displaced towards a direction so that the projection 19 of the engaging arm 18 approaches the depression 20 in the jacket 11. At a stage where the locking pin 86 reaches the position indicated by the one-dot chain line in FIG. 4, the arm portion 81-1 of the rotary arm 81 separates from the tip end sloping part 24 of the engaging arm 18. Thus, the engaging arm 18 returns to the original state, and the projection 19 enters into the depression 20. The lid plate-jacket connecting mechanism 35A also operates in a manner similar to the above lid plate-jacket connecting mechanism 35.

Hence, the lid plate 12 becomes connected to the jacket 11, and is pulled out of the reproducing apparatus 30 in this connected state.

In the above lid plate-jacket connecting mechanism 35, as the operation to push back the lid plate 12 in the direction of the inserting opening 51 is started by the main lever 63, the contact finger 62, and the spring 64, the arm portion 81-1 of the rotary arm 81 moves towards a direction so as to separate from the tip end sloping part 24 of the engaging arm 18. Accordingly, the projection 19 begins to displace towards the depression 20 simultaneously as the operation is performed to push back the lid plate 12. Therefore, the anticipated position where the lid plate 12 is connected to the jacket 11, is a position in the vicinity of the final inserting position of the jacket 11, closer to the final inserting position than in the conventional case described above.

When the jacket 11 is pulled out from the reproducing apparatus 30 in a rapid manner after inserting the jacket 11 into the final inserting position inside the reproducing apparatus 30, the initial speed at which the jacket 11 is pulled out is not high since the movement is immediately after the moving direction of the jacket 11 has reversed. Hence, this initial speed of the jacket 11 is generally smaller than the returning speed of the main lever 63 due to the spring 64. Thus, even when the jacket 11 is pulled out in a rapid manner, the lid plate 12 follows the jacket 11 to the above anticipated position, and is positively connected to the jacket 11. Therefore, the disc 15 can be positively recovered within the jacket 11.

Furthermore, the lid plate-jacket connecting mechanism 35 can be constructed as indicated by a two-dot chain line in FIG. 5, where a tension coil spring 87 is stretched and provided across between the rotary arm 81 and the main lever 63, so that the rotary arm 81 is urged to rotate towards the clockwise direction by the above spring 87. By use of this construction, the rotary arm 81 positively rotates following the main lever 63. The arm portion 81-1 moves in a direction so as to release the locking operation with respect to the engaging arm 18, without being dependent on the resilient force exerted by the engaging arm 18. Hence, the engaging arm 18 quickly returns even when the resilient force exerted by the engaging arm 18 itself is small. Accordingly, the projection 19 enters into the depression 20, and the lid plate 12 is positively connected to the jacket 11.

In addition, a compressed coil spring 88 can be assembled on the lid plate 12 as indicated by the two-dot chain line in FIG. 5, for returning the engaging arm 18. By use of this construction, the engaging arm 18 can be displaced positively towards the direction of the arrow Y1. Hence, the lid plate 12 can be positively connected to the jacket 11.

Further, this invention is not limited to these embodiments but various variations and modifications may be made without departing from the scope of the invention.

What is claimed is:

1. A reproducing apparatus for reproducing a rotary recording medium accommodated within a case, said case comprising a jacket having a space for accommodating said rotary recording medium and an opening for enabling said rotary recording medium to go into and out of said jacket, and a lid member inserted through said opening of said jacket for closing said opening of said jacket, said lid member having engaging arms for engaging said jacket, said rotary recording medium reproducing apparatus comprising:

means for defining an inserting opening in said apparatus through which said case is inserted;

lid member locking means located at an innermost part of said reproducing apparatus, for locking said lid member to said lid member locking means when said case is inserted into a final inserting position within said reproducing apparatus, and for releasing the locking with respect to said lid member when an empty jacket is inserted into the final inserting position within said reproducing apparatus; and a lid member-jacket disconnecting mechanism comprising disengaging members for deforming said engaging arms from an original state and releasing an engagement of said engaging arms with said jacket to disconnect said lid member from said jacket when said case is inserted into the final inserting position within said reproducing apparatus and then pulled from said reproducing apparatus, said disengaging members maintaining said engaging arms in a deformed state when said jacket is pulled from said reproducing apparatus so that said lid member is locked by said lid member locking means and kept within said reproducing apparatus, and a mechanism for operating said disengaging members so as to release said engaging arms from the deformed state and enable said engaging arms to resiliently return to the original state and engage said jacket, to thereby connect said lid member with said jacket, in response to an operation in which an empty jacket is inserted into and then pulled from the final inserting position within said reproducing apparatus.

2. A reproducing apparatus as claimed in claim 1 in which said engaging arms extend along an inserting direction of said case at right and left end sides of said lid member and respectively have a projection at an intermediate position thereof, said jacket having depressions into which said projections enter when said lid member is inserted within said opening of said jacket, and said disengaging members maintain said engaging arms in the deformed state when said lid member is kept within said reproducing apparatus so that said projections are out of said depressions.

3. A reproducing apparatus as claimed in claim 2 in which said mechanism of said lid member-jacket disconnecting mechanism comprises a spring member for urging said disengaging members towards directions so as to release said engaging arms from the deformed state.

4. A reproducing apparatus as claimed in claim 2 in which said lid member is assembled with a spring member for urging said disengaging members in directions so that said projections of said engaging arms enter inside said depressions in said jacket.

5. A reproducing apparatus as claimed in claim 2, in which said disengaging members are rotary arms, said rotary arms respectively have an arm portion for locking the tip end of said engaging arm of said lid member by rotating towards one direction, and for displacing said engaging arm in a direction so that said projection of said engaging arm enters into said depression in said jacket by rotating towards an opposite direction.

6. A reproducing apparatus as claimed in claim 1 in which said lid member-jacket disconnecting mechanism has a spring member for urging said lid member-jacket disconnecting mechanism toward said inserting opening and pushing back said lid member toward said inserting opening to follow said jacket, in response to an operation in which said jacket is pulled from the final inserting position within said reproducing apparatus.

* * * * *